United States Patent [19]

Harding

[11] 4,156,975

[45] Jun. 5, 1979

[54] VISUAL AID AND DISPLAY DEVICE

[76] Inventor: Douglas E. Harding, Shollond Hill, Nacton, Ipswich IP10 OEW, England

[21] Appl. No.: 870,037

[22] Filed: Jan. 16, 1978

[30] Foreign Application Priority Data

Jun. 23, 1977 [GB] United Kingdom ............... 26343/77

[51] Int. Cl.[2] ................................................ G09B 1/00

[52] U.S. Cl. ........................................... 35/1; 40/427

[58] Field of Search .................... 35/1, 8 R, 18 A, 20, 35/45, 47, 49; 40/427, 429, 430, 431

[56] References Cited

U.S. PATENT DOCUMENTS

| | | | |
|---|---|---|---|
| 25,476 | 9/1859 | Allen | 35/45 |
| 1,148,891 | 8/1915 | Coultrap | 35/47 |
| 1,189,141 | 6/1916 | Lanneau | 35/45 |
| 2,055,148 | 9/1936 | Hagner | 35/43 |
| 2,218,078 | 10/1940 | Assmuth et al. | 35/20 |
| 2,460,346 | 2/1949 | Hagner | 35/43 X |
| 2,878,591 | 3/1959 | Harris | 35/45 |
| 3,107,439 | 10/1963 | Parr et al. | 35/18 A |
| 3,284,935 | 11/1966 | Kutschmende | 40/430 |
| 3,594,924 | 7/1971 | Baker | 35/18 A |
| 4,008,534 | 2/1977 | Swartz | 40/431 |

*Primary Examiner*—William H. Grieb
*Attorney, Agent, or Firm*—Shlesinger, Arkwright, Garvey & Dinsmore

[57] ABSTRACT

A visual aid and display device is disclosed in which a central axis has mounted thereon a nest of vanes of varying length which are sheet-like members longer in length than width and concaved toward the central axis and each of which is connected to the axis at both of its ends. The vanes may be any of a number of geometrical shapes and may carry a limitless variety of visual displays on their surfaces.

10 Claims, 7 Drawing Figures

VISUAL AID AND DISPLAY DEVICE

FIELD OF THE INVENTION AND BACKGROUND

This invention relates to visual aid and display devices and is particularly related to three dimensional mechanical devices which serve to represent various abstract concepts, models of the physical world, etc.

The use of mechanical models to represent physical phenomena is well known. Examples of this can be seen in the U.S. Pat. No. 25,476, to Allen, which discloses a mechanical model of the solar system and the U.S. Pat. No. 2,218,078, to Assmuth, which involves an assembly for modeling the mitosis of cells.

A limitation suffered by such devices is their lack of modifiability. While they function well in representing one phenomenon, they cannot be adapted to represent any others.

Also, it has always been desirable in presenting abstractions of various concepts to make the means of presentation as stimulating and interesting as possible. Three dimensional representations offer an advantage over simple two dimensional pictures, drawings, graphs and the like in that the spacial relationships of the components of the three dimensional device can be used to assist in representing the organization of the concepts being modeled and in so doing provide a more intriguing representation.

There is therefore a need in the art for a three dimensional device for representing concepts in a stimulating and interesting fashion which is also adaptable to a wide variety of subject matter. This invention is directed toward this need.

SUMMARY AND OBJECTS OF THE INVENTION

An object of this invention is to provide a device of great versatility adaptable for a wide range of uses as a three dimensional display and/or visual descriptive aid.

An object of this invention is to provide a device which has an artistically pleasing structure so as to provide an interesting and stimulating three dimensional visual format for viewing its contents.

Another object of this invention is to provide a device which may be used in any size from a relatively small desk top model only inches in diameter to a room size display through which people can walk.

The invention comprises a plurality of vanes positioned on a shaft or axis in a nested fashion with the vanes having on their surfaces any desired visual display. The vanes vary in length with each being substantially longer in length than in width and substantially greater in width than in thickness and are concaved toward the axis. The vanes may be sheet-like and may come in a variety of shapes such as segments of cylinders or spheres. To achieve the nesting effect the vanes are connected to the axis at locations adjacent each of the ends of each vane with the points on the axis at which one of said vanes is connected to the axis being located between the points on the axis at which the next longest of the vanes is connected. The individual vanes may be rotatable on the axis in which case each vane should be so shaped that its rotation will not interfere with other vanes. The axis may be vertically mounted on a base.

DETAILED DESCRIPTION

Figure 1:
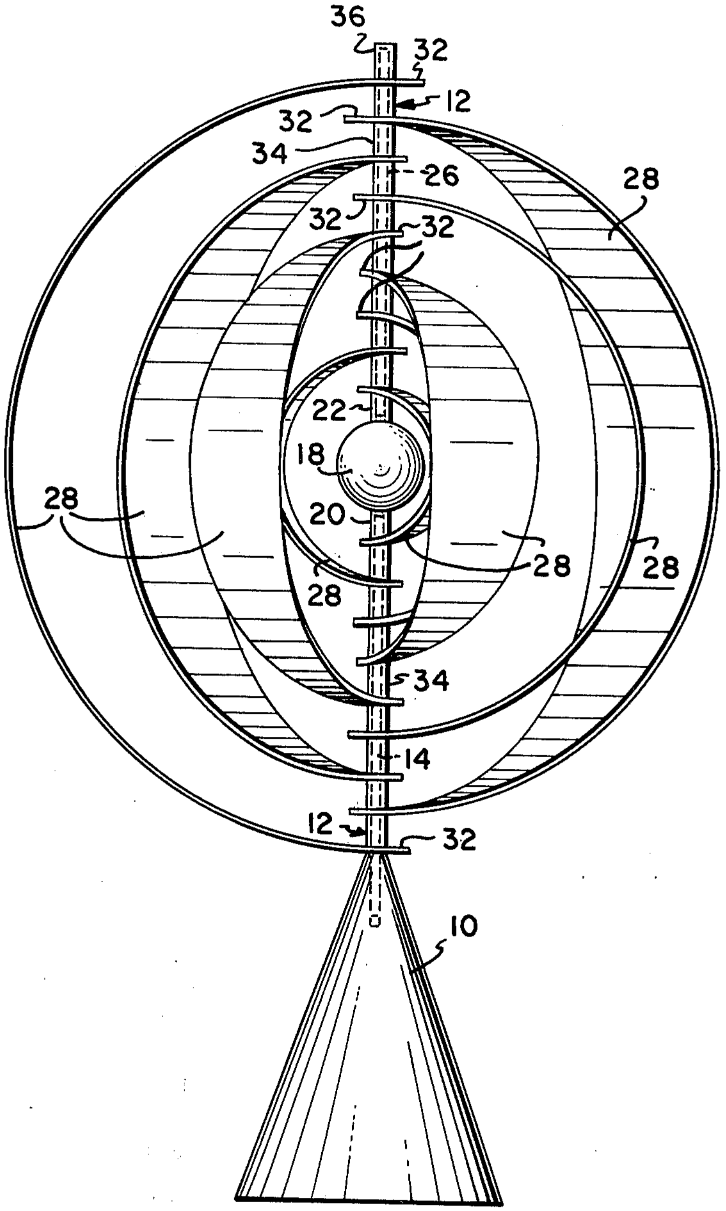
FIG. 1 is a side elevational view of a device according to this invention.
Figure 2:
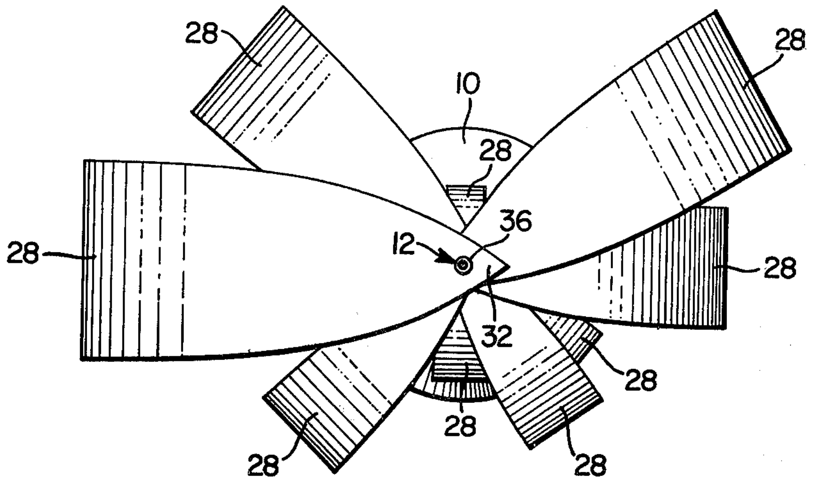
FIG. 2 is a top plan view of a device structurally the same as that of FIG. 1 but with its vanes oriented in a slightly different manner.
Figure 3:
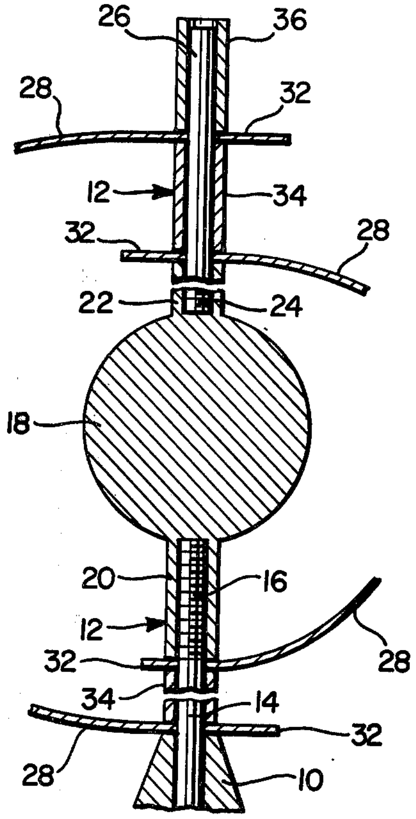
FIG. 3 is an enlarged fragmentary sectional view to better show the interconnections of the parts of the device of FIGS. 1 and 2.
Figure 4:
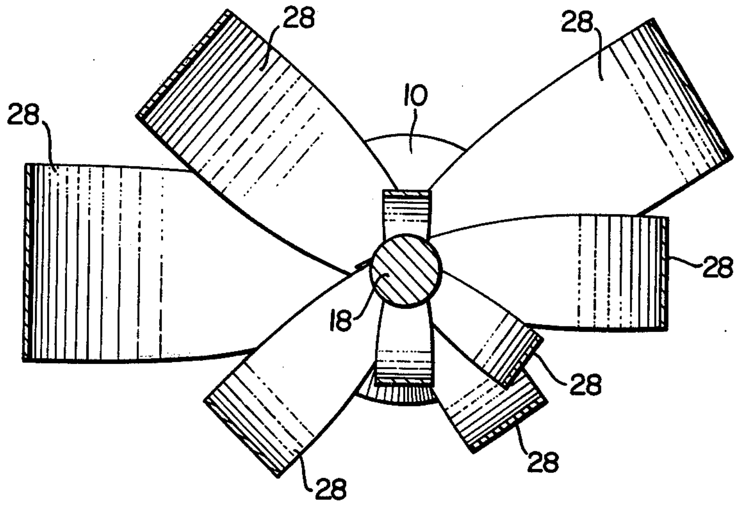
FIG. 4 is a view similar to FIG. 2 but partially in section to better show the internal arrangement of parts.

FIGS. 1 through 4 show one embodiment of a device according to this invention.

A base 10 supports a vertically positioned shaft or axis 12. The axis 12 has a lower spindle 14 mounted in the base 10 with a threaded upper portion 16. A sphere 18 is positioned on the axis 12 with its center coinciding with the center of the axis 12 although the centers need not necessarily coincide. The sphere 18 has lower and upper internally threaded sleeves 20 and 22, the lower sleeve 20 engaging the threaded portion 16 of the lower spindle 14 and the upper sleeve 22 engaging the threaded portion 24 of an upper spindle 26. The spindles 14,26 and sleeves 20, 22 need not be threaded. Alternatively, the axis 12 may have a single spindle running through the sphere 18.

Figure 5:
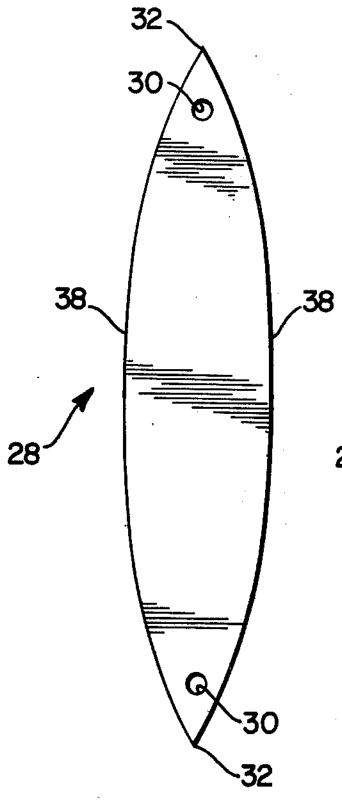
FIGS. 5, 6 and 7 are developed views of alternative forms of vanes.

Mounted on the axis 12 are a plurality of vanes 28 which are concaved toward the axis 12 and curve through an arc of approximately 180° from end to end. This results in each vane 28 having opposed ends which can be positioned on and connected to the axis 12 at locations adjacent the opposed ends of each vane 28. The vanes 28 vary in length. As shown in FIG. 5, which shows a developed vane 28 having a shape corresponding to the shape of the vanes 28 in FIGS. 1 through 4, the vanes 28 have holes 30 adjacent each of their ends 32. These holes 30 closely fit the spindles 14 and 26 and the vane ends 32 are spaced from one another by cylindrical sleeves 34 which fit over the spindles 14 and 26.

The assembly is prevented from slipping off the upper spindle 26 by a retention cap 36 placed on the upper end of the upper spindle 26.

While the vanes 28 are shown as curved through an arc of approximately 180°, the length of arc may vary depending on the intended use and the geometrical effect required.

The plurality of vanes 28 are arranged on the axis 12 so as to form a nest of curved vanes 28 with the shortest vane 28 towards the center of the nest and closest to the sphere 18 and with the vanes 28 increasing in length the farther they are situated from the sphere 18. The vanes 28 are connected to the axis 12 with the points on the axis 12 at which each successively shorter vane 28 is mounted being located between the points on the axis 12 at which the next longest vane 28 is mounted.

The sphere 18, which is positioned on the axis 12 between the points at which the shortest vane 28 is connected to the axis 12 need not be present if it would not be appropriate for the particular use to which the device is put. In such a modified structure (not shown) the axis would comprise a single long spindle running the length of the axis rather than separate upper and lower spindles. The spacing between the opposed ends of the smallest vane would be maintained by a single extra long cylindrical sleeve rather than by the sphere 18 and its threaded sleeves 20 and 22.

In the device of FIGS. 1 through 4 the nest of vanes 28 is substantially concentric with the concavity of each vane 28 being substantially centered on the same point on the axis 12 and with the sphere 18 centered on that same point. This need not however necessarily be the case.

The individual vanes may be of any shape subject only to the limitation that the length of each vane be substantially greater than its width and that its width be substantially greater than its thickness. The vanes may thus have a thickness rendering them sheet-like as shown in the accompanying figures or they may be lentiform or may be of a more complex regular or irregular form.

Figure 6:
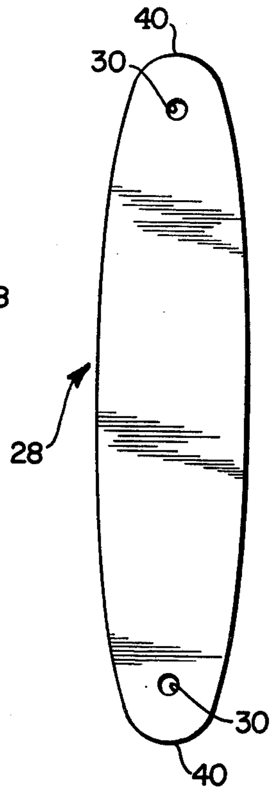
Figure 7:
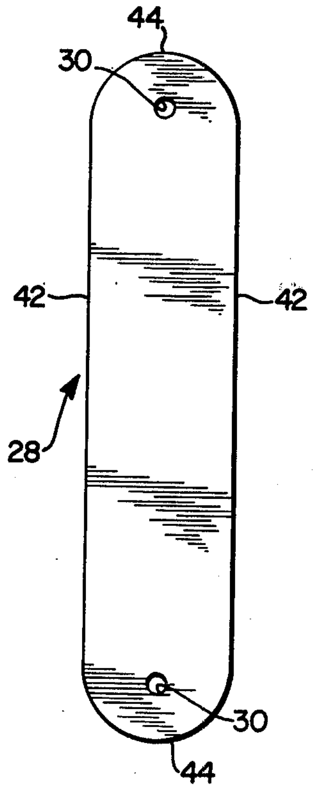

Sheet-like vanes may come in a variety of shapes. In FIGS. 1 through 5, particularly with reference to FIG. 5, they are shown having arcuate sides 38 and pointed ends 32 with each vane 28 greater in width midway along its length and tapering to a relatively narrow width at its ends 32. Sheet-like vanes, however, may also have rounded ends 40 as shown in FIG. 6 and may have straight sides 42 with rounded ends 44 as in FIG. 7. The sheet-like vanes may be segments of geometric forms such as a cylindrical or spherical segment. A cylindrical segment would be a shape defined by one of the two areas between two intersecting elliptical sections taken through a hollow cylinder while a spherical segment would be a shape defined by one of the areas between two intersecting circular sections taken through a hollow sphere.

Different types of vanes may be used to form one set or nest.

The surfaces of the vanes 28 may carry a visual display thereon (not shown) which, depending on the use intended, may appear on the interior surfaces alone, the exterior surfaces alone, both, or any combination of exterior and interior surfaces. Also depending on the intended use, the vanes 28 may be plain or colored, opaque or transparent, may have patterns, graphics, pictures, textures or any form of visual expression thereon. The vanes 28 may be preprinted or decorated or the visual displays may be applied by the user.

The vanes 28 may be made from any suitable material, for example plastic or plasticized card, and may be either flexible or preformed to the desired curvature.

At least part of the device may contain illumination means for the axis 12, for the vanes 28 and/or for the central area. The illumination means may be housed in the base 10.

Used with or without the base 10 the device may be suspended from above, supported from below or at both ends and may be oriented with the axis 12 either vertical or horizontal. The base 10 may be of any shape.

Depending on requirements, the device may be provided as a set of parts to be assembled by the user or it may be supplied prefabricated in sections or completely assembled.

The device is not limited as to its size and may range from a set of vanes sweeping through an area of only inches in diameter to one sweeping several feet in diameter such as a "walk-in" or "walk-through" display for example in a museum or art exhibition.

The vanes 28 may be fixed with respect to the axis 12 or they may be independently rotatable relative to the axis and to one another. The rotation may be accomplished manually or by means of a motor. The base 10 may contain the driving means which may act to rotate all or part of the device. If the vanes 28 are to rotate with respect to one another, then it is necessary to design the vane shapes so that they will not interfere with one another unless the vanes 28 are spherical segments and are concentrically mounted in which case no problem is presented. Generally interference problems can be avoided by shaping the vanes 28 so that they have a relatively narrow width at their ends.

The device has a large spectrum of potential uses depending on the visual display used.

The device may be used for educational, scientific or philosophical purposes such as to furnish a conspectus of information about the organizational levels of the physical world from galaxy to particle with each successive vane having a display thereon for each successive order of dimensional magnitude and the use of the device may be expanded by the use of a commentary together with a set of accompanying wall charts. It can then illustrate the relationship between the levels, between the disciplines which explore those levels and their relationship to the student. The device can be used to demonstrate and aid investigation into the user's status and meaning and identity in the universe and the extent and nature of his dependence upon it. It can present a holistic, organic view of the universe in place of a fragmented one, and provide an informed basis for ecological concern.

The device lends itself to the display of any developmental, hierarchical or logical sequence, in any of the subjects studied in school and in the university and the device can be used to aid lateral or creative thinking, or thinking in depth. For example, in a classroom situation the instructor would position the vanes at right angles to the students so that they would be viewed on edge and, as each successive member of the sequence is discussed, the instructor would rotate the appropriate vane 90° so that it could be fully seen by the students. After introduction of the entire sequence, the vanes can be left fanned out so that the whole sequence may be viewed simultaneously by the students.

For purposes of original research, study and art work, the vanes can be supplied plain for the student to illustrate.

The device can have a metaphysical, meditational or psychotherapeutic utility. The two-dimensional pattern of concentric circles, etc., known as the mandala (indicating the essential self or reality at the center, surrounded by its appearances) has long been used in the East as a meditational aid, leading towards self realization or enlightenment. When adapted to the device of this invention this well tested and age old visual aid is supplied with a third dimension, greater adaptability and versatility and up to date scientific-factual backing. Thus demythologised and developed, it may prove more effective than traditional two-dimensional prototypes.

The device can serve as an ornamental and decorative conversation piece, either hanging as a mobile or standing on a desk or table, in home, office, or institution. Or it can provide a light show with translucent colored vanes rotating at various speeds and throwing everchanging colors and patterns onto surrounding surfaces.

The device may be used for advertising purposes, for example in the form of a motorized, rotating, multi-colored motif, with central light, outside a chain of gasoline stations; or a similar motif in and outside a department store, setting out its principal departments and illustrating its merchandise. Other display applications of the device may include: a restaurant menu card; an album for photographs; a guide to any hierarchical system, in politics, government, industry, or business; or an extended address with illustrations.

The device may be used as a creative play thing for children with numbers, alphabets, words and/or pictures displayed on the vanes. For older children, the device may be a combination of a toy and an educational device, leading the child into the spheres of learning, the vanes being changed as the child progresses.

While this invention has been described as having preferred embodiments, it will be understood that it is capable of further modification. This application, is, therefore, intended to cover any variations, uses, or adaptations of the invention following the general principles thereof and including such departures from the present disclosure as come within known or customary practice in the art, and as may be applied to the eseential features hereinbefore set forth and fall within the scope of this invention or the limits of the claims.

What is claimed is:

1. A visual display device, comprising:
an axis;
a plurality of vanes varying in length connected to said axis, each of said vanes being a sheet-like member substantially longer in length than in width and concaved towards said axis and connected to said axis at locations adjacent each of the ends of said vanes, the points on said axis at which one of said vanes is connected to said axis being located between the points on said axis at which the next longest of said vanes is connected; and
each of said vanes having a visual display thereon.

2. A visual display device, comprising:
an axis;
a plurality of vanes varying in length connected to said axis, each of said vanes having a shape in which the length is substantially greater than the width and the width is substantially greater than the thickness;
each of said vanes being concaved towards said axis and connected to said axis at locations adjacent each of the ends of said vane, the points on said axis at which one of said vanes is connected to said axis being located between the points on said axis at which the next longest of said vanes is connected; and
each of said vanes having a visual display thereon.

3. The visual display device of claim 1 wherein each of said vanes comprises a cylindrical segment having a shape defined by one of the areas between two intersecting elliptical sections taken through a hollow cylinder.

4. The visual display device of claim 1 wherein each of said vanes comprises a spherical segment having a shape defined by one of the areas between two intersecting circular sections taken through a hollow sphere.

5. The visual display device of claim 1 and including a sphere positioned on said axis between the points on said axis at which the shortest of said vanes is connected to said axis.

6. The visual display device of claim 1 wherein each of said vanes is greatest in width midway along its length and tapers to a relatively narrow width at its ends.

7. The visual display device of claim 1 wherein said vanes are each independently rotatable relative to said axis and one another.

8. The visual display device of claim 1 wherein each of said vanes has arcuate sides.

9. The visual display device of claim 1 and including a base member with said axis vertically mounted on said base member.

10. A visual display device, comprising:
a spindle;
a series of cylindrical sleeves positioned on said spindle;
a plurality of vanes varying in length mounted on said spindle, each of said vanes being sheet-like member substantially longer in length than in width and concaved toward said central spindle and mounted on said spindle at locations adjacent each of the ends of said vane, said vanes being mounted between said sleeves and spaced from one another by said sleeves;
the points on said spindle at which one of said vanes is mounted on said spindle being located between the points on said spindle at which the next longest of said vanes is mounted; and
each of said vanes having a visual display thereon.

* * * * *